Jan. 21, 1930.　　　　H. McGILL　　　　1,744,564
CHANGE SPEED MECHANISM
Filed July 25, 1929
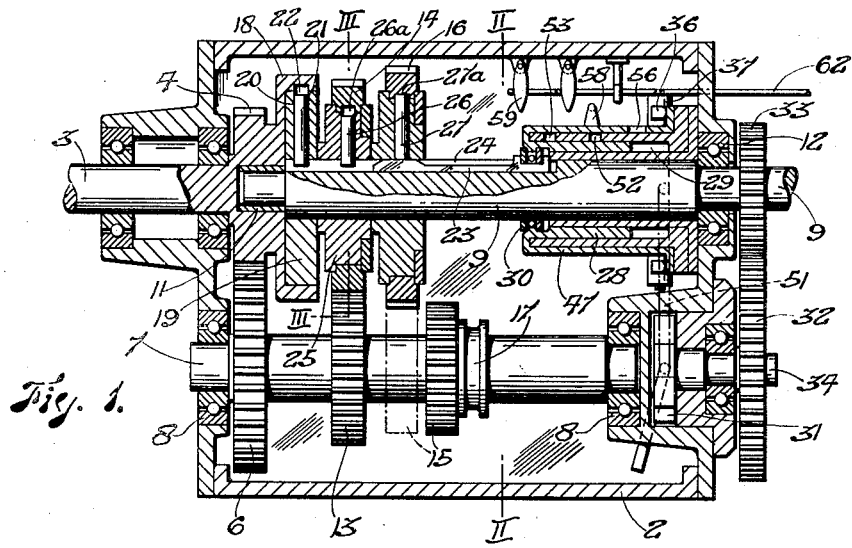
Fig. 1.
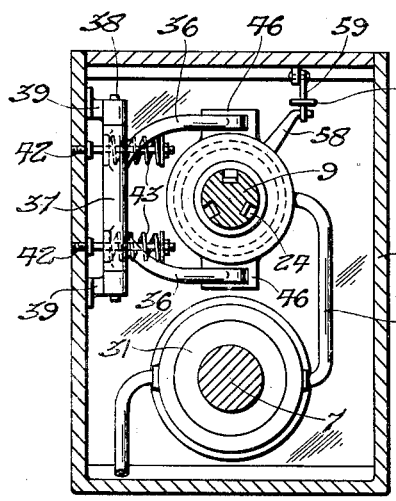
Fig. 2.
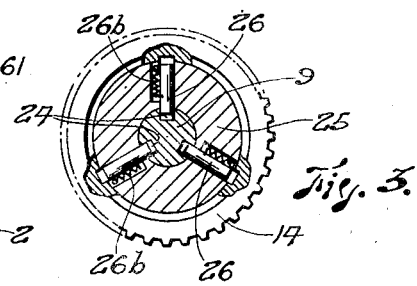
Fig. 3.
Fig. 4.
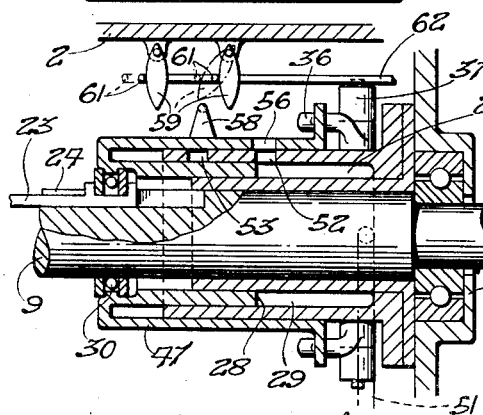
Fig. 5.
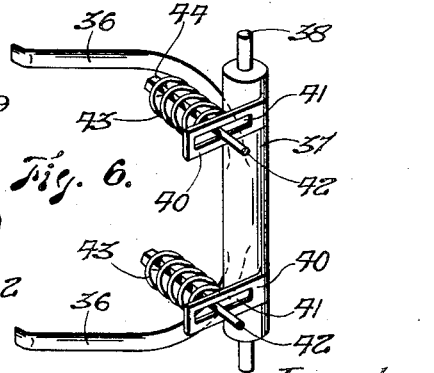
Inventor
H. McGill Patented Jan. 21, 1930

1,744,564

UNITED STATES PATENT OFFICE

HENRY McGILL, OF CANTERBURY, MELBOURNE, VICTORIA, AUSTRALIA

CHANGE-SPEED MECHANISM

Application filed July 25, 1929. Serial No. 381,029.

This invention relates to automatic change speed mechanism, particularly suitable for automobiles. More especially the invention relates to automatic change speed mechanism wherein the changes of speed ratio between driving and driven shafts are automatically effected by medium of a reciprocating piston or plunger operating within a cylinder to which fluid pressure from a pump actuated by the driven shaft is delivered to force the piston in one direction against the resistance of a spring. The cylinder has fluid escape ports controlled by the piston to thereby permit the escape of the pressure fluid when the mechanism is in the higher speed ratio positions.

The primary object of this invention is to provide improvements in such automatic change speed mechanism whereby a very positive and effective change speed action will be ensured, the time involved in actually changing from one speed ratio to a higher speed ratio being reduced to a minimum.

Another object is to provide means for momentarily and automatically checking the speed of the driving shaft immediately prior to the engagement of the mechanism in its higher speed positions in order to prevent any jar or jolt which might otherwise occur in changing to a higher speed.

The invention will be described at greater length with the aid of the accompanying drawings which illustrate an automatic change speed mechanism suitable for automobiles and incorporating one form of my present improvements.

Referring to the drawings which form part of this specification:—

Figure 1 represents a longitudinal section of automatic change speed mechanism embodying the present invention.

Figure 2 is a cross section on the line II—II in Figure 1.

Figure 3 is a cross section on the line III—III in Figure 1.

Figure 4 is a detail of a cam rod.

Figure 5 is an enlarged fragmentary section showing the relative positions of the piston and associated parts when they have been moved to select the next highest speed ratio to that indicated in Figure 1.

Figure 6 is a detail of spring means for opposing the forward movement of the piston and for returning it to a normal position upon reduction of pressure.

In the drawings the numeral 2 denotes a casing having suitable bearings for supporting a driving shaft 3 which is the present instance is intended to be connected to the engine of an automobile. The driving shaft has a pinion 4 constantly meshed with a wheel 6 fixed to a lay shaft 7 supported by bearings 8 so as to extend within the casing 2 parallel to a driven shaft 9 which is coaxial with the driving shaft. The driven shaft 9 may be supported at one end in a bush bearing 11 fitted in the boss portion of pinion 4, and at its other end by a bearing 12.

A gear wheel 13 fixed to the lay shaft meshes with a toothed wheel or ring 14 loosely mounted on the driven shaft 9 so as to effect a change speed ratio when the ring is made fast on the driven shaft in the manner hereinafter described. The lay shaft 7 is also fitted with a pinion 15 which is longitudinally slidable upon, but rotatable with, said shaft. This sliding pinion is adapted to be placed into mesh with a toothed wheel or ring 16 which is loosely mounted with respect to the driven shaft 9 but is adapted to be locked thereon when the low speed ratio is required. The sliding pinion 15 may be operated by means of levers or rods (not shown) and for this purpose it may have a recessed boss 17 to receive the bifurcated end of a lever or other device of suitable construction.

A clutch member or ring 18 which is formed on the main driving pinion 5, encircles a circular block or disc 19 which is keyed or otherwise secured to the driven shaft 9. This circular block or disc may be constructed with three or more radial guideways 20 which are arranged in required spaced relationship to accommodate sliding bolts 21 adapted to engage recesses 22 formed in the inner periphery of the clutch member or ring 18. The sliding bolts 21 are maintained out of engagement with the recesses 22 by springs and are adapted to be forced outwardly against the resistance of the springs, into engagement with said recesses, by rods 23 which are longitudinally slidable in grooves 24 formed in the driven shaft. The clutch member 18, when locked to the circular block or disc 19, on the driven shaft 9, causes motion from the driving shaft 3 to be transmitted to said driven shaft at the highest speed ratio which is one to one.

The toothed wheel or ring 14 on the driven shaft 9 loosely encircles a circular block 25 similar in construction to the circular block 19. It is fitted with radial sliding locking bolts 26 adapted to engage recesses 26$^a$ formed in the inner periphery of the toothed ring 14. Said locking bolts are operated against spring resistance by means of the aforesaid rods 23.

The toothed ring 16, which is normally loose on the driven shaft, is similar in construction to the toothed ring 14 but of larger diameter and is adapted to be locked on said shaft by sliding bolts 27 through the medium of the rods 23. The bolts 27, the bolt recesses 27$^a$ and the springs 27$^b$ of the toothed ring 16 may be substantially the same as the bolts, recesses and springs for the clutch member 18 and the toothed ring 14.

The rods 23 operating the locking bolts for the clutch member 18 and the change speed toothed rings 14 and 16, are disposed radially about the driven shaft 9, and they are adapted to be moved in a longitudinal direction by a reciprocating piston 28 operating in a cylinder 29. This cylinder, which encircles the driven shaft 9, has its front end open, and is rigidly secured at its rear end to the wall of the gear box 2, while the piston 28 is attached to the sliding rods 23 by a thrust ball bearing 30 in such a manner that said rods may rotate freely with the shaft 9. The piston 28 is adapted to be forced outwardly by fluid, for instance the lubricating oil in the casing, under pressure derived from a pump 31 of any suitable design or construction. This pump is driven at the required speed from the shaft 9 by the gear wheels 32 and 33 mounted on the pump shaft 34 and on the shaft 9 respectively.

The power derived from the pump 31 is governed by the speed of said pump and causes the piston 28 to be moved in a forward direction against a spring influenced lever or forked arms 36 connected to a rod 37 adapted to turn around a pin 38 supported by brackets 39. The rod may have outstanding lugs 40 provided with slots 41 to pass bolts 42 secured to the casing 2. Springs 43 encircle the bolts 42 between the lugs 40 and nuts 44.

The arms 36 may engage a flange 46 at one end of a sleeve member 47 which snugly fits around the cylinder 29 and is formed integral with or connected to the piston 28 so as to move therewith. The arms 36 transmit the pressure of the springs 43 to the sleeve 47 and the piston 28 which are thereby returned to their normal positions as indicated in Figure 1 when the pressure or power of the pump is reduced due to a reduction of the speed of the driven shaft 9. The cylinder may be connected to the chamber of the pump by piping 51 and is provided with longitudinally spaced escape ports 52 and 53 adapted to be uncovered by the piston at certain periods in its travel as will be referred to hereinafter.

The aforesaid sleeve 47 projects forwardly of the piston and is provided near its front with a port or slot 56 which is longitudinally aligned with the cylinder ports 52, 53. The rear edge of the port 56 is preferably about flush with the front end of the piston.

The operation of the mechanism is as follows: From the neutral position the sliding pinion 15 is moved by a lever (not shown) along the lay shaft 7 to mesh with the toothed ring 16, as indicated by broken lines in Figure 1. The cam portions of the rods 23 being engaged with the sliding bolts 27 lock the toothed ring 16 to the shaft 9 so that the drive will be transmitted from shaft 3 through pinion 4, wheel 6, shaft 7, pinion 15 and wheel 16 to shaft 9. The shaft 9 actuates the pump 31 so that when the pressure of the fluid forced into the cylinder 29 at the back of the piston is sufficient to overcome the resistance of the spring pressed arms 36 the piston will be moved forwardly and cause the cam portions of the rods 23 to pass from under the locking bolts 27 of the toothed ring 16 (thereby releasing the ring 16 from the shaft 9) and engage the locking bolts 26 with the second speed toothed ring 14, thus changing the speed ratio from third or low to second. When in this position the piston uncovers the cylinder port 52 with which the port 56 in the sleeve now registers as in Figure 5 so that the pressure fluid may escape.

When the fluid pressure within the cylinder increases due to increased speed of the driven shaft, the piston and sleeve are forced further forward against the spring pressed arms and during the early part of this movement the front part of the sleeve 46 closes the cylinder port 52 and prevents further escape of fluid so that there is only the resistance of the spring pressed arms 36 to overcome. The piston and sleeve continue the forward movement until the piston uncovers cylinder port 53, the sleeve port 56 registers with cylinder port 53 and the front end of the sleeve clears cylinder port 52. In so doing the ring 14 is freed from the driven shaft 9 and the locking bolts 21 lock the clutch member 18 to the driven shaft 9 whereby the latter will be driven at first or top speed. The reverse action takes place when the speed of the driven shaft 9 decreases under increased load.

As the speed of the pump 31 is governed by the speed of rotation of the driven shaft 9, it will be readily understood that a change of speed ratio is automatically effected in accordance with decrease or increase of speed at which an automobile vehicle is travelling when the change speed mechanism is used on such a vehicle. It will also be evident that by preventing the escape of pressure fluid from the cylinder whilst the piston is moving forwardly that the change into higher speed ratios will be effected rapidly and positively.

If desired the cylinder ports 52 and 53 may be controlled from outside the gear box, that is to say they may be closed or partly closed by manually operated controls so that the mechanism can be kept in the positions giving top or second speed ratios when desired. Furthermore the pipe 51 may be provided with a byepass, also controlled from outside the gear box, so as to deflect the flow of oil from the pump 31, thus enabling a vehicle provided with the mechanism to descend hills in low gear.

It will be evident that additional or intermediate speed ratios may be obtained by the provision of additional toothed rings on the driven shaft 9 and fixed gears on the lay shaft 7, and by provision of additional appropriately disposed ports in the cylinder 29 and the sleeve 47. The rods 23, the cylinder 29, the piston 28 and the sleeve 47 may also be lengthened if necessary.

In order to prevent any jar or jolt when the mechanism reaches its higher speed positions provision may be made for automatically reducing the speed of the driving shaft 3 just before the locking actions of the bolts 26, 21 take place. For this purpose the piston 28 or the sleeve 47 may have a striker 58 aligned with longitudinally spaced pivoted hangers or trip levers 59 adapted normally to lie against pins or projections 61 of a slidable rod 62 adapted to be connected to the usual throttle or to the accelerator pedal controlling the intake of fuel to the engine cylinders. As the piston is approaching the higher speed positions the striker engages the respective trip levers and causes same to move the rod, as indicated by broken lines in Figure 5, into such position as to close the throttle of the engine fuel intake and thus temporarily reduce the speed of the driving shaft 3 while the toothed ring 14 or the clutch 18 is being locked to the driven shaft 9.

During return movement of the piston the trip levers are swung about their pivots by the striker and do not operate the rod 62.

It will be understood that any suitable reversing gear may be embodied in the mechanism to give one or more speeds in reverse.

Having now described my invention what I claim as new and desire to secure by Letters Patent is:—

1. In automatic change speed mechanism, a driving shaft, a driven shaft, a cylinder, a piston in said cylinder, a pump operable by the driven shaft to supply fluid under pressure to said cylinder so as to move the piston in one direction, means operatively connected to said piston for changing the speed ratio between the driving and the driven shafts, said cylinder having escape ports adapted to be consecutively uncovered by the piston as it is moved into positions for effecting changes of the speed ratios to permit the escape of the fluid, and means operating automatically to close said cylinder ports while the piston is moving towards higher speed positions and to open at least one of said ports as the piston arrives in such higher speed positions.

2. In automatic change speed mechanism, a driving shaft, a driven shaft, a cylinder, a piston in said cylinder, a pump operable by the driven shaft to supply fluid under pressure to said cylinder so as to move the piston forward, means operatively connected to said piston for changing the speed ratio between the driving and driven shafts, said cylinder having longitudinally spaced ports which are consecutively uncovered by the piston as it moves forwardly, and means operating synchronously with said piston to close said cylinder ports while the piston is moving forwardly to a higher speed position and to open at least one of said ports as the piston arrives at each higher speed position.

3. In automatic change speed mechanism, a driving shaft, a driven shaft, members for transmitting power from the driving shaft to the driven shaft normally loose on said driven shaft, a cylinder, a piston in said cylinder, a pump operable by the driven shaft to supply fluid under pressure to said cylinder so as to move the piston in a forward direction, means operatively connected to said piston for individually locking said transmission members to said driven shaft at certain periods in the forward travel of said piston, said cylinder having longitudinally spaced escape ports for the pressure fluid adapted to be consecutively uncovered by the forwardly moving piston, and a ported member moving with said piston on the exterior of said cylinder, said ported member being adapted to close said cylinder ports while the piston is moving to higher speed ratio positions and to open at least one of said ports when the piston arrives at such higher speed ratio position.

4. In automatic change speed mechanism a driving shaft, a driven shaft, a cylinder, a piston in said cylinder, a pump operable by the driven shaft to supply fluid under pressure to said cylinder so as to move the piston forwardly, means operable by the piston to change the speed ratio between the driving and driven shafts, said cylinder having longitudinally spaced ports adapted to be uncovered by the piston as it moves forwardly into a position for changing the speed ratio, and a sleeve moving with said piston and encircling said cylinder so as to close the cylinder ports during movement of the piston, said sleeve having a port adapted to register with one of the cylinder ports when the piston reaches a higher speed ratio position.

5. In automatic change speed mechanism a driving shaft, a driven shaft, a cylinder, a piston in said cylinder, a pump operable by the driven shaft to supply fluid under pressure to said cylinder so as to move the piston in one direction, means operatively connected to said piston for changing the speed ratio between the driving and the driven shafts, said cylinder having escape longitudinally spaced ports for the pressure fluid adapted to be uncovered by the piston as it moves into positions for effecting changes of the speed ratios, means operating synchronously with said piston to close said cylinder ports while the piston is moving towards higher speed positions and to open at least one of said ports as the piston arrives in such higher speed positions, and means for momentarily and automatically reducing the speed of the driving shaft just before the mechanism is engaged in any of its higher speed positions.

6. In automatic change speed mechanism, a driving shaft, a driven shaft, a cylinder, a piston in said cylinder, a pump operable by the driven shaft to supply fluid under pressure to said cylinder so as to move the piston in one direction, means operatively connected to said piston for changing the speed ratio between the driving and the driven shafts, said cylinder having escape ports for the pressure fluid adapted to be uncovered by the piston as it moves into positions for effecting changes of the speed ratios, means operating synchronously with said piston adapted to close said cylinder ports while the piston is moving towards higher speed positions and to open at least one of said ports as the piston arrives in such higher speed positions, and means actuated by said piston just before it arrives in a higher speed position for operating a speed control device for said driving shaft whereby the speed of the latter is automatically and temporarily reduced.

7. In automatic change speed mechanism a driving shaft, a driven shaft, a cylinder, a piston in said cylinder, a pump operable by the driven shaft to supply fluid under pressure to said cylinder so as to move the piston in one direction, means operatively connected to said piston for changing the speed ratio between the driving and driven shafts, said cylinder having longitudinally spaced escape ports for the pressure fluid adapted to be uncovered by the piston as it moves into a position for effecting changes of the speed ratios, means adapted to close said cylinder ports while the piston is moving towards higher speed positions and to automatically open at least one of the ports as the piston arrives in such higher speed positions, a speed control device associated with said driving shaft, and a striker moving with said piston and adapted to actuate said speed control device just before the piston arrives at a higher speed ratio position to thereby momentarily and automatically reduce the speed of said driving shaft.

8. Automatic change speed mechanism comprising a driving shaft, a driven shaft, a lay shaft continuously driven from the driving shaft, a series of change speed transmission members on said lay shaft, a series of coacting transmission members on said driven shaft, one of said series of transmission members being loosely mounted on the respective shaft, means for locking any one of said loosely mounted members to its shaft, and operating means for said locking means comprising a cylinder, a piston in said cylinder connected to the locking means, a pump operable by the driven shaft to supply fluid under pressure to said cylinder, and a sleeve encircling said cylinder and movable with said piston, said cylinder having longitudinally spaced ports and said sleeve having a port adapted to register with one of said cylinder ports only when the mechanism is in a higher speed ratio position.

9. Automatic change speed mechanism according to claim 8 and including means operable by said sleeve adapted to momentarily reduce the speed of the driving shaft just before the port of the sleeve registers with a cylinder port during the forward movement of the piston.

10. In automatic change speed mechanism, comprising a driving shaft, a driven shaft, a number of transmission members loosely mounted upon said driven shaft, locking means whereby said transmission members may be independently and separately made fast on the driven shaft, a cylinder arranged around the driven shaft, a piston in said cylinder, means connected to said piston for operating said locking means, a pump operable by the driven shaft for delivering fluid under pressure to said cylinder so as to force said piston forwardly, said cylinder having longitudinally spaced ports adapted to be uncovered by said piston, and means for closing said ports during motion of the piston and to automatically open at least one of them as the piston arrives in positions to operate said locking means.

In witness whereof I affix my signature.

H. McGILL.